(12) United States Patent
Xu

(10) Patent No.: US 9,073,181 B2
(45) Date of Patent: Jul. 7, 2015

(54) COMBINED POSITIONING DEVICE FOR SIDE BEAM OF STAINLESS STEEL CAR ROOF

(75) Inventor: Xiaoyang Xu, Changchun (CN)

(73) Assignee: Changchun Railway Vehicles Co. Ltd, Changchun, Jilin (CN)

(*) Notice: Subject to any disclaimer, the term of this patent is extended or adjusted under 35 U.S.C. 154(b) by 358 days.

(21) Appl. No.: 13/699,036

(22) PCT Filed: Jul. 12, 2011

(86) PCT No.: PCT/CN2011/077054
§ 371 (c)(1),
(2), (4) Date: Feb. 5, 2013

(87) PCT Pub. No.: WO2012/022206
PCT Pub. Date: Feb. 23, 2012

(65) Prior Publication Data
US 2013/0134643 A1    May 30, 2013

(30) Foreign Application Priority Data
Aug. 19, 2010  (CN) ............... 2010 2 0501475 U

(51) Int. Cl.
| | |
|---|---|
| B25B 1/00 | (2006.01) |
| B25B 1/20 | (2006.01) |
| B25B 1/02 | (2006.01) |
| B25B 5/14 | (2006.01) |
| B23K 37/04 | (2006.01) |
| B25B 5/00 | (2006.01) |

(52) U.S. Cl.
CPC ............. *B25B 5/14* (2013.01); *B23K 37/0443* (2013.01); *B25B 5/006* (2013.01)

(58) Field of Classification Search
CPC ............ B66F 3/00; B25B 5/003; B25B 5/00; B25B 5/10; B25B 5/103; A47F 7/19; A47F 5/08; A47F 5/0815
USPC ......... 269/152, 45, 71, 143, 249; 248/231.61, 248/228.5
See application file for complete search history.

(56) References Cited

U.S. PATENT DOCUMENTS

| | | | | |
|---|---|---|---|---|
| 4,089,448 A | * | 5/1978 | Traeger | 224/507 |
| 4,149,694 A | * | 4/1979 | Verini | 248/539 |
| 4,165,869 A | * | 8/1979 | Williams | 269/41 |

(Continued)

FOREIGN PATENT DOCUMENTS

| | | |
|---|---|---|
| CN | 201300852 Y | 9/2009 |
| CN | 201777323 U | 3/2011 |

(Continued)

OTHER PUBLICATIONS

International Search Report for corresponding International Patent Application No. PCT/CN2011/077054 mailed Oct. 20, 2011.

*Primary Examiner* — Lee D Wilson
*Assistant Examiner* — Seahee Yoon
(74) *Attorney, Agent, or Firm* — Merchant & Gould P.C.

(57) ABSTRACT

The utility model provides a combined positioning device for a side beam of a stainless steel car roof, comprising an inner cavity positioning block (2), an external support body (3), an external positioning block (4), a push rod (5), and clamps (6), a top side of the inner cavity positioning block (2) fits in with a top inner portion of the side beam (7) of the car roof, the external support body (3) is adjustably connected to a surface of the inner cavity positioning block (2), the external positioning block (4) is adjustably connected to a surface of the external support body (3), an elongated nut of the push rod (5) is integrated with the inner cavity positioning block (2), and the clamps (6) are used to clamp two edges of the side beam (7) of the car roof. With the present utility model, the side beam of the car roof can be supported by fitting the inner cavity positioning block in with the top inner portion of the side beam of the car roof, and sizes such as width and height can be adjusted through adjustments of the external support body connected to the inner cavity positioning block, the external positioning block and the clamps.

1 Claim, 2 Drawing Sheets

(56) References Cited

U.S. PATENT DOCUMENTS 5,253,896 A * 10/1993 Verbeski ................. 280/808
5,340,083 A *  8/1994 Suhy et al. ............... 254/100

FOREIGN PATENT DOCUMENTS

| EP | 2 030 877 A1 | 3/2009 |
| JP | 7-196039 A | 8/1995 |

* cited by examiner

COMBINED POSITIONING DEVICE FOR SIDE BEAM OF STAINLESS STEEL CAR ROOF

This application is a National Stage Application of PCT/CN2011/077054, filed 12 Jul. 2011, which claims benefit of Serial No. 201020501475.6, filed 19 Aug. 2010 in China and which applications are incorporated herein by reference. To the extent appropriate, a claim of priority is made to each of the above disclosed applications.

FIELD OF INVENTION

The present utility model relates to field of manufacturing a rail car, more particularly, to positioning of a side beam during production of a stainless steel car roof, for example, used in rail cars in Hong Kong Subway and associated vehicles.

DESCRIPTION OF THE RELATED ART

Now, side beams of a stainless steel car roof are positioned by use an integral positioning block, the shape of which is hard to be made to fit in with that of the side beams of a car body, and especially for Hong Kong Subway having complex shapes, it is difficult to control positioning and adjustment of the contour of the side beams, and sizes such as width and height of the side beams, of the car roof.

SUMMARY OF INVENTION

One object of the present utility model is to provide a combined positioning device for a side beam of a stainless steel car roof, solve the above problem that the shape of the integral positioning block is hard to be made to be fit with that of the side beam of the car body during welding production of the stainless steel car roof, and achieve a purpose of controlling positioning and adjustment of the contour of the side beam, and sizes such as width and height of the side beam, of the car roof.

In order to achieve the above object, the present utility model provides a combined positioning device for a side beam of a stainless steel car roof, being characterized in that comprising an inner cavity positioning block, an external support body, an external positioning block, a push rod, and clamps, a top side of the inner cavity positioning block fits in with a top inner portion of the side beam of the car roof, the external support body is adjustably connected to a surface of the inner cavity positioning block, the external positioning block is adjustably connected to a surface of the external support body, an elongated nut of the push rod is integrated with the inner cavity positioning block, and the clamps are used to clamp two edges of the side beam of the car roof.

With the present utility model, the following advantage effects can be achieved: (1) the side beam of the car roof can be supported by fitting the inner cavity positioning block in with the top inner portion of the side beam of the car roof; (2) sizes such as width and height can be adjusted through adjustments of the external support body connected to the inner cavity positioning block, the external positioning block and the clamps.

DETAILED DESCRIPTION OF PREFERRED EMBODIMENTS

Figure 1:
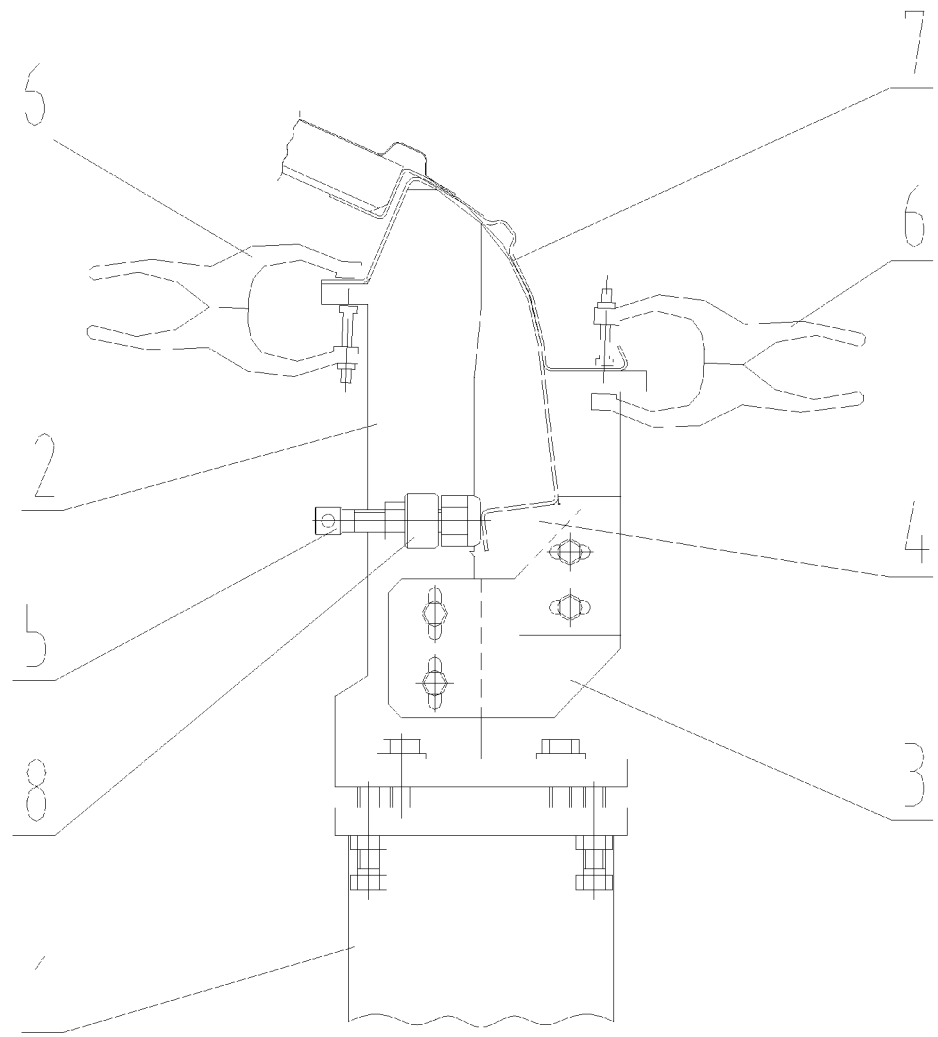
FIG. 1 is a diagram showing a structure of a combined positioning device for a side beam of a stainless steel car roof according to the present utility model.
Figure 2:
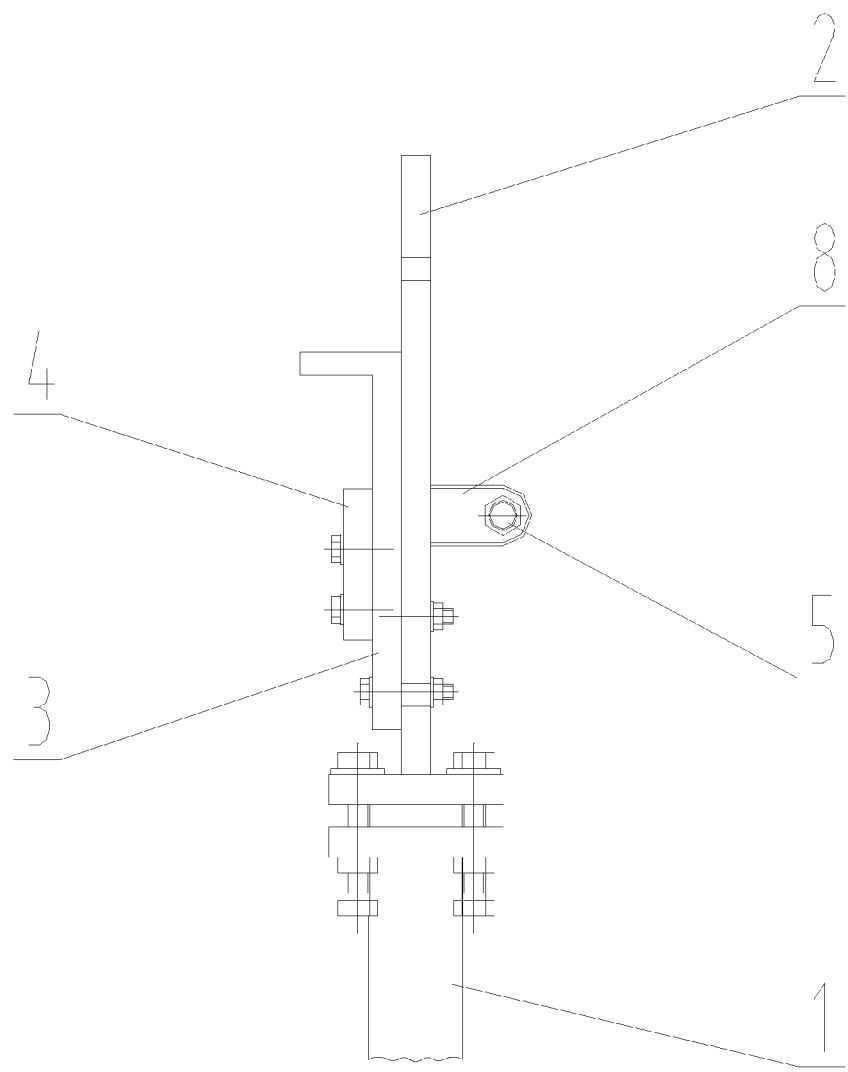
FIG. 2 is a left view of the structure shown in FIG. 1.

With reference to FIGS. 1 and 2, an upright column 1 is used to support the positioning device. An inner cavity positioning block 2 is connected to the upright column 1 by using bolts and is adjusted in height and levelness through the bolts. The inner cavity positioning block 2 fits in with a top inner portion of a side beam 7 of a car roof to support the side beam 7. An external support body 3 is connected to a surface of the inner cavity positioning block 2 by using bolts and used to support an external edge of the side beam 7. An external positioning block 4 is connected to a surface of the external support body by using bolts and used to support a corner arc of the side beam 7. A push rod 5 consists of a screw rod and an elongated nut 8 which is integrated with the inner cavity positioning block. The elongated nut 8 is screwed such that a head portion of the screw rod butts against a lower edge of the side beam 7, so that the side beam 7 abut against the external positioning block 4. Clamps 6 are used to clamp two edges of the side beam 7 of the car roof, and thus positioning accuracy of the side beam 7 can be maintained to be stable.

Since positioning components are connected to each other by using bolts, and connection holes for bolts therebetween are provided as long slots, sizes such as width and height could be adjusted according to shapes of the side beams of the stainless steel car body. Thus, the above problem that the shape of the integral positioning block is hard to be made to be fit with that of the side beam of the car body during welding and assembling production of the stainless steel car roof can be solved, and it is possible to control positioning and adjustment of the contour of the side beam, and sizes such as width and height of the side beam, of the car roof for Hong Kong Subway having complex shapes.

What is claimed is:

1. A combined positioning device for a side beam of a stainless steel car roof, being characterized in that comprising an inner cavity positioning block, an external support body, an external positioning block, a push rod, and clamps, a top side of the inner cavity positioning block fits in with a top inner portion of the side beam of the car roof, the external support body is adjustably connected to a surface of the inner cavity positioning block, the external positioning block is adjustably connected to a surface of the external support body, an elongated nut of the push rod is integrated with the inner cavity positioning block, and the clamps are used to clamp two edges of the side beam of the car roof.

* * * * *